(12) United States Patent
Ndu et al.

(10) Patent No.: US 12,353,557 B2
(45) Date of Patent: Jul. 8, 2025

(54) GENERATING ALERTS FOR UNEXPECTED KERNEL MODULES

(71) Applicant: HEWLETT PACKARD ENTERPRISE DEVELOPMENT LP, Houston, TX (US)

(72) Inventors: Geoffrey Ndu, Bristol (GB); Gustavo Knüppe, Porto Alegre (BR)

(73) Assignee: Hewlett Packard Enterprise Development LP, Spring, TX (US)

( * ) Notice: Subject to any disclaimer, the term of this patent is extended or adjusted under 35 U.S.C. 154(b) by 331 days.

(21) Appl. No.: 18/045,228

(22) Filed: Oct. 10, 2022

(65) Prior Publication Data

US 2024/0119155 A1 Apr. 11, 2024

(51) Int. Cl.
*G06F 21/57* (2013.01)
*H04L 9/06* (2006.01)
*H04L 9/08* (2006.01)
*H04L 9/32* (2006.01)

(52) U.S. Cl.
CPC .......... *G06F 21/572* (2013.01); *H04L 9/0643* (2013.01); *H04L 9/0825* (2013.01); *H04L 9/3213* (2013.01)

(58) Field of Classification Search
CPC ...... G06F 21/572; G06F 21/57; G06F 9/0643; H04L 9/0643; H04L 9/0825; H04L 9/3213; H04L 9/06
USPC .......................................................... 713/193
See application file for complete search history.

(56) References Cited

U.S. PATENT DOCUMENTS

| | | | |
|---|---|---|---|
| 7,552,326 B2 * | 6/2009 | Liu .......................... | G06F 21/57 713/164 |
| 9,111,099 B2 | 8/2015 | Paris et al. | |
| 9,608,823 B2 | 3/2017 | Smith et al. | |
| 9,858,109 B2 * | 1/2018 | Tsirkin ..................... | G06F 21/52 |
| 10,250,619 B1 * | 4/2019 | Park ......................... | H04L 63/18 |
| 10,298,398 B2 * | 5/2019 | Deshpande ........... | H04W 12/02 |
| 10,701,130 B2 * | 6/2020 | Movsisyan ............. | H04L 41/30 |
| 10,747,875 B1 * | 8/2020 | Stoler .................... | H04L 9/3247 |
| 10,868,825 B1 * | 12/2020 | Dominessy ........... | H04L 43/045 |
| 11,575,704 B2 * | 2/2023 | MacLeod ............ | H04L 63/0236 |
| 11,775,649 B2 * | 10/2023 | Ndu ........................ | G06F 13/24 713/2 |
| 12,032,730 B2 * | 7/2024 | Sicconi .................. | G06N 20/00 |
| 2011/0167259 A1 * | 7/2011 | Fanton .................. | H04L 9/0643 713/164 |
| 2012/0311341 A1 * | 12/2012 | Paris ....................... | G06F 21/57 726/4 |

(Continued)

FOREIGN PATENT DOCUMENTS

| | | |
|---|---|---|
| CN | 111259392 | 6/2020 |
| KR | 100456512 | 11/2004 |

*Primary Examiner* — Sargon N Nano
(74) *Attorney, Agent, or Firm* — Trop, Pruner & Hu, P.C.

(57) ABSTRACT

A process includes, responsive to a request to load a kernel module, determining, by an operating system kernel, a hash digest for the kernel module. The kernel module is associated with a name. The process includes determining, by the operating system kernel, whether an expected kernel module list contains an entry that contains the name and associates the name with the hash digest. The process includes, responsive to the determination of whether the expected kernel module list contains the entry, generating, by the operating system kernel, an alert that is associated with the kernel module.

18 Claims, 7 Drawing Sheets

(56) References Cited

U.S. PATENT DOCUMENTS

2019/0306197 A1* 10/2019 Degioanni .......... H04L 63/1425
2019/0384918 A1* 12/2019 Ndu ...................... G06F 21/575
2022/0188423 A1    6/2022 Ndu et al.
2022/0377093 A1* 11/2022 Crabtree ............... H04L 43/045

* cited by examiner

GENERATING ALERTS FOR UNEXPECTED KERNEL MODULES

BACKGROUND

A computer platform (e.g., a server) may be subject to a security attack in which an attacker seeks to access information that is stored on the computer platform or harm components of the computer platform. For purposes of preventing security attacks or at least inhibiting the degree of harm inflicted by security attacks, the computer platform may have different levels of protection. For example, the computer platform may have various mechanisms to limit access, such as firewalls, passwords, keys, and so forth. As another example, the computer platform may have malware protection software that scans directories, searching for malware agents. As another example, the computer platform may regularly measure its software components, so that the measurements may be analyzed (e.g., by analysis tools on a remote server) to determine whether tampering has occurred. As another example, events (login password failures, website accesses, and so forth) occurring in the computer platform may be monitored using a system information and event management (SIEM) system.

DETAILED DESCRIPTION

Figure 1:
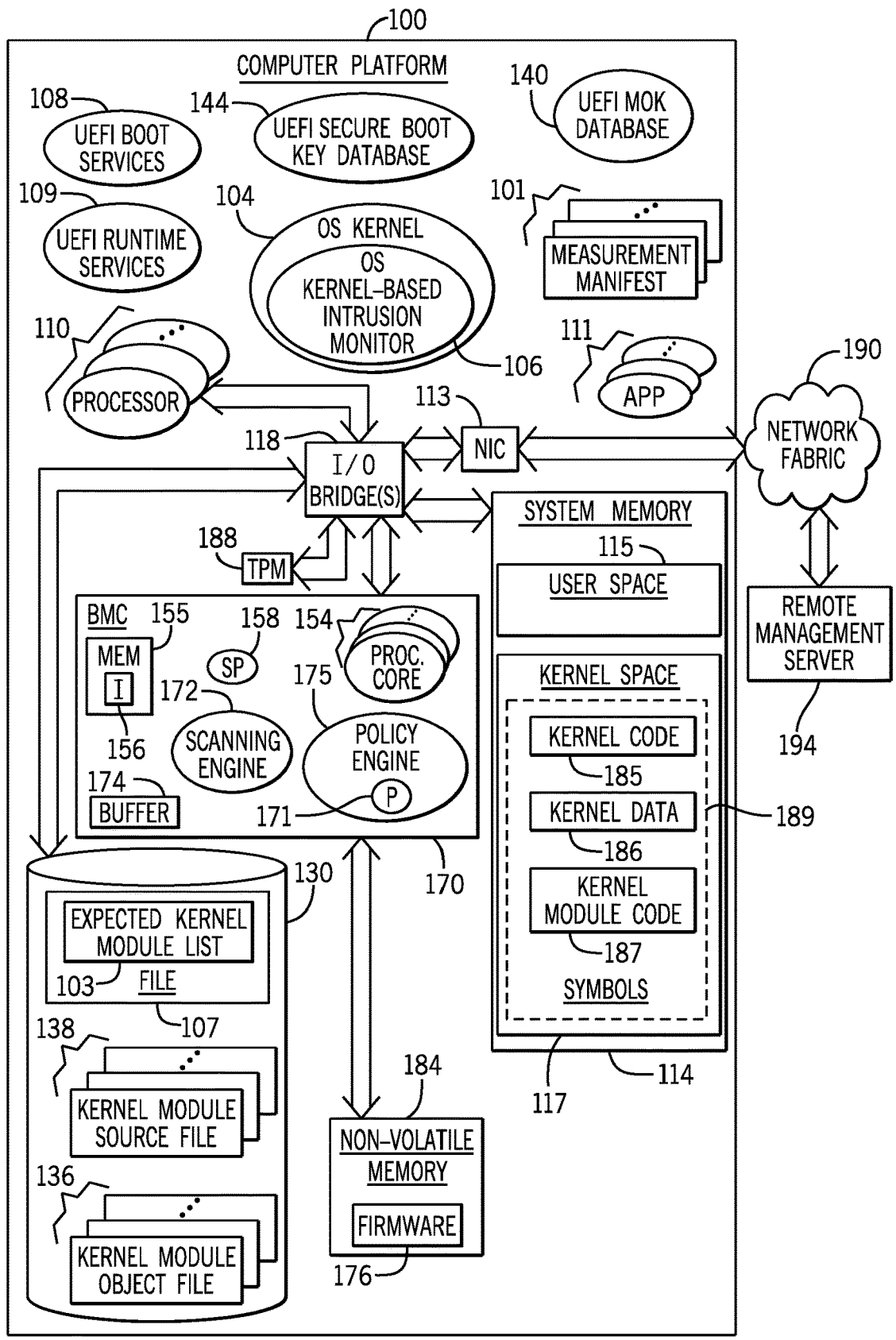
FIG. 1 is a block diagram of a computer platform that includes an operating system kernel-based intrusion monitor and a baseboard management controller-based scanning engine according to an example implementation.

A computer platform may be subject to a security attack in which an attacker injects program code or changes read-only data. Such a security attack may target an operating system kernel (also called a "kernel" herein) of the computer platform. One approach to detecting security attacks on a kernel involves a computer platform monitoring the kernel during runtime for changes so that the computer platform may undertake responsive actions if the kernel changes in an unexpected way.

A kernel module (also called a "loadable kernel module") may be an attack vector for a security attack on a computer platform. A kernel module, which is a collection of one or multiple subroutines and data, may be used to add functions to the kernel. More specifically, a computer platform, as part of a boot process, may load a base kernel that has a corresponding fixed functionality. In this context, a "base kernel" (or "main kernel") refers to a core, or main, interface between hardware of a computer platform and processes of the computer platform. The base kernel may correspond to a monolithic kernel image. The functionality of the base kernel may be extended through the use of kernel modules. A "kernel module," in the context used herein, refers to a unit of machine-readable instructions (or "code") and data, which may be executed to extend, or add to, the functionality of an operating system kernel. A kernel module is "loaded," which refers to a process that links the kernel module to the base kernel so that the subroutines of the kernel module may be executed in the kernel space of the computer platform.

As a specific example, for the Linux operating system, a kernel module may be an executable and linkable format (elf) file that has a ".ko" filename extension. As an example, a kernel module may add kernel functions to mount a file system. As another example, a kernel module may be a device driver adding kernel functions to access a particular physical or virtual device of the computer platform. As another example, a kernel module may add one or multiple system calls.

A kernel module may be loaded as part of the computer platform's boot process. After boot, the kernel may load kernel modules during the runtime of the computer platform. Here, "runtime" refers to the environment after the operating system has been loaded, and control of the computer platform is transferred to the operating system. The kernel may dynamically load a kernel module at runtime responsive to user space actions. The kernel may load a kernel module at runtime responsive to a user issuing a command. In the context used herein, an action (e.g., an execution of a command) that initiates the loading of a kernel module may be referred to as a "request" to load the kernel module.

One potential approach to prevent kernel modules from being used as security attack vectors is to validate the cryptographic signatures of the respective kernel modules. The validation of a kernel module's cryptographic signature may be used to verify that the kernel module originates with a trusted source and verify that tampering with the kernel module has not occurred. However, validation of a kernel module's signature may not by itself be sufficient to prevent the kernel module from posing a security risk. Although the kernel module may be properly signed, the kernel module may have a vulnerability that may be exploited by an attacker. For example, a kernel module may have a security vulnerability that allows an attacker to achieve a local privilege escalation. As a more specific example, an attacker may, through user space activities, prompt the loading of a driver (a kernel module) for a non-existent hardware component (e.g., a storage device) for purposes of exploiting a vulnerability of the driver (e.g., local privilege escalation).

Another security measure that may be used to prevent kernel modules from being used as attack vectors is to generate an alert (e.g., a "critical alert") whenever a kernel module is loaded. For example, a trusted kernel module may be loaded at or near the end of the boot process to provide a kernel module monitor, and the monitor may generate alerts for any kernel modules that are subsequently loaded. The alerts may, for example, be communicated to a remote management server for evaluation by a system administrator or sent to a SIEM system for evaluation by a security analyst. Moreover, a component (e.g., a baseboard management controller) of the computer platform may first process the alerts for purposes of determining which alerts to forward. A challenge with this approach is that the approach assumes that any kernel module loaded after the monitor is suspect, which may be a rather impractical assumption and may result in a considerable number of alerts being generated during runtime. Such a large number of alerts may place a considerable load, or burden, on components on and off the computer platform. For example, a computer platform sending a large number of alerts may result in alert fatigue for users (e.g., a system administrator and SIEM security analysts) who respond to the alerts.

In accordance with example implementations that are described herein, a computer platform contains an operating system kernel-based intrusion monitor (also called a "kernel-based intrusion monitor" or an "intrusion monitor" herein) that monitors the loading of kernel modules for purposes of identifying any kernel modules that are not authorized, or expected, and generating alerts in response thereto. More specifically, in accordance with example implementation, the kernel-based intrusion monitor determines whether a given kernel module is authorized, or expected, by comparing information about the given kernel module to information that is contained in a list of authorized, or expected, kernel modules (herein called the "expected list of kernel modules"). In accordance with example implementations, the kernel-based intrusion monitor, in response to the loading of a given kernel module, calculates a fingerprint, such as a hash digest, for the given kernel module and determines a name of the given kernel module. The expected list of kernel modules, in accordance with example implementations, contains entries that correspond to kernel modules, which are authorized, or expected, to be loaded on the computer platform. Each entry, in accordance with example implementations, contains a fingerprint and a name for an expected kernel module.

In accordance with example implementations, the kernel-based intrusion monitor, for a given kernel module, examines the expected list of kernel modules to determine if any of the entries of the list corresponds to the given kernel module. For example, the kernel-based intrusion monitor may examine the expected list of kernel modules to determine whether the list contains an entry having the same name of a given kernel module, and if such an entry exists, the kernel-based intrusion monitor may then determine whether a fingerprint for the given kernel module corresponds with the fingerprint contained in the entry. If the given kernel module is not an expected kernel module, as determined by the check against the list of expected kernel modules, then, in accordance with example implementations, the intrusion-based kernel monitor generates an alert.

Generating alerts for unexpected kernel modules may be beneficial as a control measure for a wide variety of reasons, such as detecting security attacks in a timely manner and preventing erroneous operations of the computer platform. For example, an unexpected kernel module may be part of a coordinated security attack on the computer platform, and prompt detection of the unexpected kernel module may mitigate harm otherwise caused by the security attack. Moreover, although an unexpected kernel module may be loaded with benign intentions, the kernel module may not have been properly vetted for security vulnerabilities, which could expose the computer platform to a security attack. An unexpected kernel module may be known to have a bug, or defect, or may not have been properly vetted for defects. For these cases, the unexpected kernel module may, for example, cause malfunctioning of the computer platform. Moreover, an unexpected kernel module may provide one or multiple functions that are beyond the scope of functions designated for a particular computer platform, and an unexpected kernel module may alter functions of a computer platform in an unintended manner. Filtering out alerts for expected kernel modules using an expected kernel module list, as described herein, may be beneficial for such purposes as reducing the burden otherwise placed on computer resources and personnel (e.g., not sending alerts for expected kernel modules may mitigate or prevent alert fatigue and may free up resources of the computer platform to perform other tasks).

Referring to FIG. 1, as a more specific example, in accordance with some implementations, a computer platform 100 may have include one or multiple processors 110 (e.g., one or multiple central processing units (CPUs), one or multiple CPU processing cores, and other hardware processors); and a system memory 114. The system memory 114 and other memories discussed herein are non-transitory storage media that may be formed from semiconductor storage devices, memristor-based storage devices, magnetic storage devices, phase change memory devices, a combination of devices of one or more of these storage technologies, and so forth. The system memory 114 may represent a collection of memories of both volatile memory devices and non-volatile memory devices.

In accordance with example implementations, the system memory 114 includes a user space 115 and a kernel space 117. The kernel space 117 represents locations of the system memory 114, which store machine-readable instructions, data and data structures corresponding to an operating system kernel 104 (also referred to as a "kernel 104" herein). The user space 115 represents locations of the system memory 114, which are used by non-operating system kernel processes, or user processes, such as processes that correspond to executing instances of applications 111, virtual machine instances, container instances, as well as other processes.

The computer platform 100 is just one example of a number of different potential architectures in accordance with many possible implementations. Regardless of its particular architecture, a "computer platform" in the context used herein, is a processor-based electronic device, which has an operating system that has an associated kernel space and user space. As examples, the computer platform may be a standalone server, a rack-mounted server module; an edge processing, rack-mounted module; a server blade; a blade enclosure containing one or multiple server blades; a client; a thin client; a desktop computer; a portable computer; a laptop computer; a notebook computer; a tablet computer; a smartphone; a wearable computer; and so forth.

In accordance with example implementations, the kernel 104 includes a base kernel. The functions of the base kernel may be extended through the use of kernel modules. FIG. 1 depicts the kernel 104 including an intrusion monitor 106. In accordance with example implementations, the intrusion monitor 106 may be a trusted kernel module that is loaded during a boot (e.g., a secure boot or a measured boot) of the computer platform 100.

In accordance with example implementations, after the intrusion monitor 106 is loaded, the intrusion monitor 106 becomes part of the kernel 104 and may hook into machine-readable instructions, or code, that is used by the base kernel to load and unload kernel modules. The hooking into the code provides notifications to the intrusion monitor 106 of kernel module load events that correspond to the loading (or attempted loading) of kernel modules. The kernel module load events may be considered to be correspond to requests to load kernel modules. The hooking into the code may also provide notifications to the intrusion monitor 106 of kernel module unload events that correspond to the unloading of kernel modules. In accordance with example implementations, the notifications of the kernel module load events serve as triggers for actions that are taken by the intrusion monitor 106 for purposes of evaluating whether the loaded kernel modules are expected or unexpected, as further described herein.

Among its other functions, in accordance with some implementations, the intrusion monitor 106 monitors the operating system kernel 104 to determine whether any unexpected changes to the kernel 104 have occurred, and if so, the intrusion monitor 106 takes the appropriate responsive action(s). More specifically, in accordance with example implementations, the intrusion monitor 106 may monitor parts of the kernel 104, which are stored in the kernel space 117, such as kernel code 185 (e.g., machine-readable instructions corresponding to the base kernel), kernel data 186 and kernel module code 187 (e.g., machine-readable instructions of one or multiple kernel modules that have been loaded into the kernel 104). In accordance with example implementations, the monitored parts of the kernel 104 correspond to symbols 189.

In this context used herein, a "symbol" refers to a specific region of the kernel space 117. As more specific examples, symbols 189 may include regions of the kernel space 117, which corresponds to kernel read only data; code and read only data of kernel modules; an interrupt descriptor table; input/output (I/O) memory management unit (IOMMU) tables, system call tables, system process tables, jump tables, as well as other and/or different parts of the kernel space 117. The symbols 189 may also include portions of the kernel space 117, which correspond to the intrusion monitor 106, which means that the intrusion monitor 106 may monitor itself.

In accordance with example implementations, the intrusion monitor 160 determines initial, or baseline, integrity measurements for the respective symbols 189. For example, a baseline integrity measurement for a given symbol 189 may be a cryptographic hash digest of the corresponding kernel space content when the computer platform 100 first boots and transitions to a runtime environment. As another example, the baseline integrity measurement for a given symbol 189 may be calculated near or at the time the corresponding kernel module, kernel code or kernel data is loaded. In the context used herein, a "hash digest" (which may also be referred to as a "hash," "a hash value," "a cryptographic hash," or "a cryptographic hash value") is produced by the application of a cryptographic hash function to a value (e.g., an input, such as an image or binary). A "cryptographic hash function" may be a function that is provided through the execution of machine-executable instructions by a processor (e.g., one or multiple CPUs, one or multiple CPU processing cores, and so forth).

The cryptographic hash function may receive an input, and the cryptographic hash function may then generate a hexadecimal string to match the input. For example, the input may include a string of data (for example, the data structure in memory denoted by a starting memory address and an ending memory address). In such an example, based on the string of data the cryptographic hash function outputs a hexadecimal string. Further, any minute change to the input may alter the output hexadecimal string. In another example, the cryptographic hash function may be a secure hash function (SHA), any federal information processing standards (FIPS) approved hash function, any national institute of standards and technology (NIST) approved hash function, or any other cryptographic hash function. In some examples, instead of a hexadecimal format, another format may be used for the string.

In accordance with example implementations, the intrusion monitor 106 may regularly measure the symbols 189 and compare the measurements against the baseline measurements for purposes of detecting any deviations from the baseline measurements, which are unexpected. Depending on the particular implementation, the measuring of the symbols 189 and the corresponding comparison may be periodically, pursuant to a schedule, responsive to events, or may be performed in accordance with other and/or different criteria.

In accordance with example implementations, an entity of the computer platform 100, which is separate from the kernel 104, such as a baseboard management controller 170, may also regularly measure the symbols 189 and compare the measurements against the baseline measurements for purposes of detecting any deviations from the baseline measurements, which are unexpected. As a more specific example, in accordance with some implementations, the baseboard management controller 170 may include a kernel integrity scanning engine (called the "scanning engine 172" herein) that regularly measures the symbols 189, compares the measurements against baseline measurements and takes appropriate responsive actions in response to the comparisons. An example of the scanning engine 172 is described in U.S. Patent Application Pub. No. 2019/0384918, entitled, "Measuring Integrity of Computing System," which published on Dec. 19, 2019. The scanning of the symbols 189 by an entity, such as the scanning engine 172, which is separate, or independent, from the kernel 104, may be beneficial for purposes of detecting tampering with the kernel 104 (and therefore, detecting potential tampering with the intrusion monitor 106) by a relatively powerful adversary.

As used herein, a "baseboard management controller" is a specialized service processor that monitors the physical state of a server or other hardware using sensors and communicates with a management system through a management network. The baseboard management controller 170 may communicate with applications executing at the operating system level through an input/output controller (IOCTL) interface driver, a representational state transfer (REST) application program interface (API), or some other system software proxy that facilitates communication between the baseboard management controller 170 and applications. The baseboard management controller 170 may have hardware level access to hardware devices located in a server chassis including system memory. The baseboard management controller 170 may be able to directly modify the hardware devices. The baseboard management controller 170 may operate independently of the operating system of the computer platform 100. The baseboard management controller 170 may be located on the motherboard or main circuit board of the server or other device to be monitored.

The fact that a baseboard management controller is mounted on a motherboard of the managed server/hardware or otherwise connected or attached to the managed server/hardware does not prevent the baseboard management controller from being considered "separate" from the server/hardware. As used herein, a baseboard management controller has management capabilities for sub-systems of a computing device, and is separate from a processing resource that executes an operating system of a computing device. As such, the baseboard management controller 170 of the computer platform, as an example, is separate from the processor(s) 110, which execute the high-level operating system for the computer platform 100.

In accordance with example implementations, the intrusion monitor 106 responds to kernel module loading event notifications for purposes of identifying whether any of the kernel modules is unauthorized, or unexpected. In accordance with example implementations, the intrusion monitor 106 determines whether a given kernel module is authorized, or expected (and accordingly determining whether the kernel module is unexpected), by comparing information about the given kernel module to information that is contained in an expected kernel module list 103.

More specifically, in accordance with example implementations, the intrusion monitor 106, in response to the loading of a given kernel module, determines a hash digest for the given kernel module and determines a name of the given kernel module. The intrusion monitor 106 may then check the hash digest and the name of the given kernel module against the information that is contained in the expected kernel module list 103 for purposes of determining whether the given kernel module is expected. If unexpected, then, in accordance with example implementations, the intrusion monitor 106 generates an alert. As further described herein, in accordance with example implementations, the scanning engine 172 of the baseboard management controller 170 may handle the alert, including taking one or multiple responsive actions to respond to the alert, as further described herein.

The intrusion monitor 106, in accordance with example implementations, uses the expected kernel module list 103 to detect unexpected kernel modules during the runtime of the computer platform 100. In accordance with some implementations, the computer platform 100 may be booted using a secure boot or a measured boot, and as such, it may be assumed that no unauthorized kernel modules were loaded during the boot.

In accordance with further implementations, the intrusion monitor 106 may determine whether any unauthorized, or unexpected, kernel modules were loaded during the boot of the computer platform 100 based on the information that is contained in the expected kernel module list 103. For example, in accordance with some implementations, the intrusion monitor 106 may be loaded as a kernel module at or near the end of the boot of the computer platform 100. The intrusion monitor 106 may evaluate the kernel modules that were loaded before the intrusion monitor 106 and check these kernel modules against the information that is contained in the expected kernel module list 103 for purposes of determining whether any of these kernel modules are unexpected. In a similar manner, the intrusion monitor 106 may evaluate any kernel module(s) loaded after the intrusion monitor 106 during the boot and determine whether the kernel module(s) are unexpected.

The expected kernel module list 103, in accordance with example implementations, may be stored in a static location that is known to the intrusion monitor 106, so that the intrusion monitor 106 may read the expected kernel module list 103 every time the computer platform 100 boots. As depicted in FIG. 1, in accordance with some implementations the expected kernel module list 103 may be part of file 107 that is stored on a storage device 130. As an example, in accordance with some implementations, the file 107 may be stored in a predetermined file path (e.g., /etc/authorized_kernel_module_list.config).

In accordance with some implementations, the scanning engine 172 may take one or multiple responsive actions in response to an alert (provided by the intrusion monitor 106) that a particular kernel module is unexpected. As examples, in accordance with some implementations, the responsive action may involve sending a computer platform alert notification (e.g., a Redfish message) to a remote management server 194, as well as other actions. In accordance with some implementations, a policy engine 175 of the baseboard management controller 170 may select the specific responsive action(s) taken by the scanning engine 172 for an unexpected kernel module. For this purpose, the policy engine 175 may apply one or multiple policies 171, which set forth one or multiple responsive actions and criteria for the policy engine 175 to use in deciding which responsive action(s) to take.

As an example, in accordance with some implementations, a policy 171 may specify a certain response (e.g., sending an alert message to the remote management server) for all unexpected kernel module alerts. In accordance with further implementations, a policy 171 may define a particular responsive action and one or multiple criteria for the policy engine 175 to apply for purposes of the policy engine 175 deciding when to apply the responsive action. For example, in accordance with some implementations, a policy 171 may specify a first responsive action (e.g., powering down the computer platform 100 or isolating the computer platform 100 from the network fabric 190) for unexpected kernel modules that are loaded during the boot of the computer platform 100 and a second responsive action (e.g., sending a computer platform alert notification message to the remote management server 194) for unexpected kernel modules that are loaded during the computer platform's runtime (i.e., the environment of the computer platform 100 after the boot). A policy 171 may specify a responsive action when certain criteria are satisfied. As examples, the criteria may be a particular category, or class, of the unexpected kernel module; a count of the number of expected kernel modules reaching a threshold count; a pattern (e.g., a time pattern or a sequence) associated with unexpected kernel modules; a specified kernel module name; or other criteria. A policy 171 may specify any of a number of different responsive actions. Moreover, as further described herein, a policy 171 may depend on the particular application, or purpose, of the computer platform 100.

In accordance with example implementations, the intrusion monitor 106 communicates information about the symbols 189 to the scanning engine 172. For symbols 189 that correspond to kernel modules, this information may include, as further described herein, data representing unexpected kernel module alerts. In accordance with example implementations, for purposes of communicating symbol information and unexpected kernel module alerts, the baseboard management controller 170 may contain a buffer 174 (e.g., one or multiple registers) that is mapped into a memory space or input/output (I/O) space that is accessible by the intrusion monitor 106. As a more specific example, the processor(s) 110, in the execution of the instructions corresponding to the intrusion monitor 106, may access the buffer 174 via an interconnect (e.g., a Peripheral Component Interface express (PCIe) link).

The symbol information 189 and unexpected kernel module alerts are communicated to the scanning engine 172, in accordance with some implementations, using measurement manifests 101. The measurement manifests 101 contain information about the symbols 189 and any unexpected kernel module alerts for symbols 189 that correspond to kernel modules. In accordance with example implementations, the intrusion monitor 106 writes data to the buffer 174 representing the measurement manifests 101. In accordance with some implementations, the intrusion monitor 106 may generate the measurement manifests 101 pursuant to a particular policy (e.g., generate one or multiple management manifests 101 at the beginning of runtime, generate measurement manifests 101 pursuant to a schedule, as well as generate the measurement manifests 101 pursuant to other criteria).

In accordance with some implementations, as further described herein, the measurement manifest 101 contains entries for respective symbols 189. One or multiple symbols of a given measurement manifest may correspond to a kernel module. In accordance with example implementations, for an entry of the measurement manifests, which corresponds to a kernel module, the entry contains an alert field (also called an "alert flag"), which includes data (e.g., a bit) that represents whether or not the kernel module is expected. The scanning engine 172 processes the entries of the measurement manifests 101 to extract information about the symbols 189 for purposes of acquiring parameters for the kernel space symbol scanning and being notified about any unexpected kernel modules.

Among its other features, the computer platform 100, in accordance with example implementations, may include one or multiple input/output (I/O) bridges 118, which allow communications between the processors 110 and the baseboard management controller 170, as well as communications with various I/O devices, such as one or multiple storage devices 130; one or multiple network interface controllers (NICs) 113; a trusted platform module (TPM) 188; a video controller; and so forth. More specifically, in accordance with some implementations, the bridge(s) 118 may include a north bridge 118 that includes a memory controller (for system memory 114 accesses) and Peripheral Component Interconnect express (PCIe) root ports. Moreover, the bridge(s) 118 may include a south bridge that provides I/O ports, such as, for example, Serial Advanced Technology Attachment (SATA) ports, Universal Serial Bus (USB ports), Low Pin Count (LPC) ports, Serial Peripheral Interface (SPI) ports, extended SPI (eSPI) ports, and so forth. In accordance with some implementations, the north bridge may be part of the processors 110. In accordance with further implementations, the north and south bridges may be combined into a single bridge 118, and in accordance with some implementations, this single bridge 118 may be part of the processors 110.

In addition to executing machine-readable instructions to provide the operating system kernel 104 (including the intrusion monitor 106 and any other loaded kernel modules), the processor(s) 110 may execute instructions to provide firmware runtime services 109 (e.g., Unified Extensible Firmware Interface (UEFI) runtime services), and firmware boot services 108 (e.g., UEFI boot services and a basic input/output system (BIOS)). The processor(s) 110 may also execute instructions to provide one or multiple application instances 111 and various other processes for the computer platform 100, such as a container daemon, a hypervisor, container instances, container pods, and virtual machine instances. In accordance with example implementations, the baseboard management controller 170 may use a NIC 113 external to the baseboard management controller 170 to communicate with the remote management server 194 via network fabric 190. In accordance with some implementations, the baseboard management controller 170 may have a dedicated NIC for this purpose. The network fabric 190 may be associated with one or multiple types of communication networks, such as (as examples) Fibre Channel networks, Compute Express Link (CXL) fabric, dedicated management networks, local area networks (LANs), wide area networks (WANs), global networks (e.g., the Internet), wireless networks, or any combination thereof.

In accordance with example implementations, the baseboard management controller 170 may have a management plane and a separate, security plane. Through its management plane, the baseboard management controller 170 may provide various management services for the computer platform 100. In accordance with some implementations, these management services may include the baseboard management controller 170 performing actions, as described herein, in association with the scanning engine 172 and the policy engine 175. Additionally, in accordance with example implementations, the baseboard management controller 170 may provide various other management services, such as monitoring sensors (e.g., temperature sensors, cooling fan speed sensors); monitoring operating system status; monitoring power statuses; logging computer platform 100 events; providing remotely controlled management functions for the computer platform 100; and so forth. Through its security plane, the baseboard management controller 170, in accordance with example implementations, provides security functions, or services, for the computer platform 100, such as key management (e.g., functions relating to storing and loading cryptographic keys), firmware image validation, platform cryptographic identity retrieval, measurement hash loading, measurement hash retrieval, and so forth.

In accordance with example implementations, the baseboard management controller 170 includes one or multiple general purpose processing cores 154 (e.g., CPU cores). In accordance with example implementations, the processing core(s) 154 execute instructions (e.g., instructions that are part of a firmware image 176 stored in a non-volatile memory 184) that correspond to a management stack to provide various management services for the computer platform 100 as part of the baseboard management controller's management plane. The baseboard management controller 170 may include a security processor 158 (e.g., a CPU core) that may, as part of the baseboard management controller's security plane, validate the management stack instructions (e.g., validate based on an expected measurement fingerprint, such as a hash digest), and if the instructions pass validation, load the instructions into a volatile memory 155 for execution by the processing core(s) 154. In accordance with example implementations, as part of the management services, the general purpose processing core(s) 154 may access and execute instructions that are stored in the memory 155 to provide the scanning engine 172 and the policy engine 175.

In accordance with further implementations, all or part of the scanning engine 172 and/or the policy engine 175 may be provided by dedicated hardware (e.g., logic gates) that performs one or multiple functions for the scanning engine 172 and/or the policy engine 175 without executing machine-readable instructions. In this manner, this hardware may, depending on the particular implementation, be or include an application specific integrated circuit (ASIC), a field programmable gate array (FPGA), a complex programmable logic device (CPLD), or other hardware component(s).

In accordance with example implementations, the storage device(s) 130 may store one or multiple kernel module object files 136 (e.g., for a Linux kernel, an elf file having a ".ko" filename extension), which correspond to respective kernel modules. In accordance with some implementations, a given kernel module object file 136 may correspond to the intrusion monitor 106. Other kernel module object files 136 may correspond to kernel modules that are evaluated by the intrusion monitor 106 when loaded. In accordance with example implementations, although the kernel module object file 136 may not be directly executable (or be an "executable"), the kernel module object file 136 contains data and executable machine-readable instructions (also called a "binary" or "code"), which are associated with one or multiple subroutines and are the result of the compilation of one of multiple kernel module source files 138. As described further herein, the kernel module object file 136 may contain an information section, which provides information about the kernel module object file 136 and its associated source file(s) 138.

As depicted in FIG. 1, the storage device(s) 130 may store kernel module source files 138. In accordance with further implementations, the kernel module source files 138 may be stored in off platform storage, and in accordance with example implementations, the kernel module source files 138 may be stored in a storage device that is not accessible by the computer platform 100.

The base kernel may load one or multiple kernel module object files 136 (corresponding to the loading of the respective kernel modules) during the boot of the computer platform 100. For example, a configuration file may specify a list of kernel module object files 136 to be loaded as part of the boot of the computer platform 100.

The base kernel may load one or multiple kernel module object files 136 (corresponding to the loading of the respective kernel modules) during the runtime of the computer platform 100. For example, a kernel module object file 136 may be loaded on demand. In this context, "on-demand loading" refers to the base kernel initiating the loading of a kernel module object file 136 responsive to one or multiple conditions being met. As an example, a base kernel may initiate the loading of a kernel module object file 136 in response to the base kernel attempting to access a resource (e.g., a file system) and finding the resource unavailable. The base kernel may create a user space process to run a helper program (e.g., a modprobe program for a Linux kernel) to aid the kernel module loading. For example, the base kernel may specify criteria (e.g., specify a generic file system or a generic host adapter) for a resource, and the user space helper program may, based on the specified criteria, identify a specific kernel module object file 136 corresponding to the criteria.

The runtime loading of a kernel module object file 136 may be initiated manually. For example, an administrator having the appropriate credentials may initiate the loading of a kernel module object file 136 via commands that are entered through a command line interface.

Figure 2:
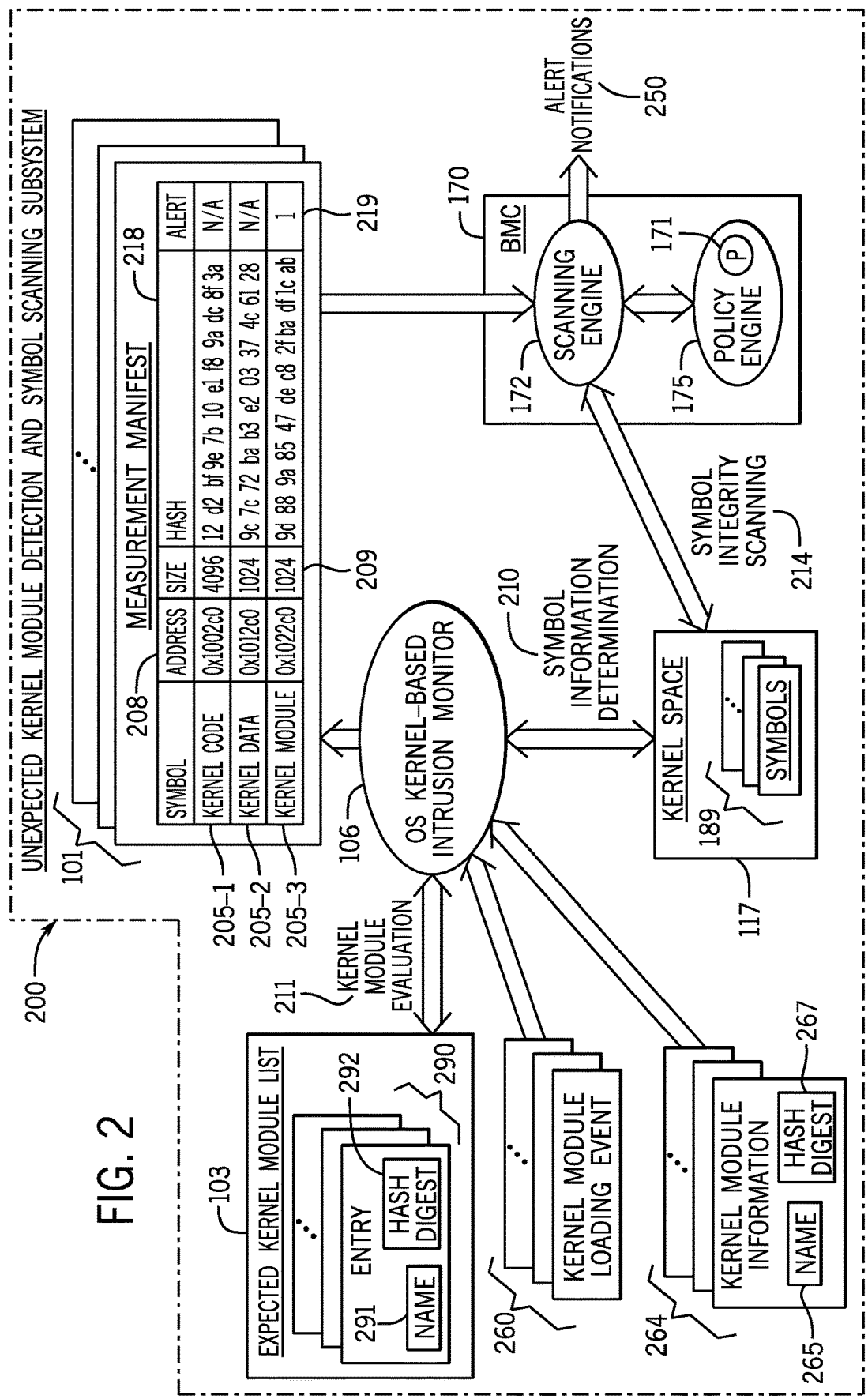
FIG. 2 is an illustration of a subsystem of the computer platform of FIG. 1 to detect unexpected kernel modules and send alerts to the scanning engine to notify the scanning engine about the unexpected kernel modules according to an example implementation.

FIG. 2 depicts an illustration of an unexpected kernel module detection and symbol scanning subsystem 200 of the computer platform 100 of FIG. 1 according to an example implementation. Referring to FIG. 2, in accordance with example implementations, the subsystem 200 includes the intrusion monitor 106 and the baseboard management controller 170.

In accordance with example implementations, the intrusion monitor 106 may respond to kernel module loading events 260. The kernel module loading event 260 corresponds to a kernel module being loaded. In response to the kernel module loading event 260, the intrusion monitor 106 determines identifying information 264 for the corresponding kernel module. Using the information 264, the intrusion monitor 106 may perform a corresponding kernel module evaluation 211 to determine whether the kernel module is expected. In accordance with example implementations, the intrusion monitor 106 performs the kernel module evaluation 211 by checking the identifying information 264 for the kernel module against expected kernel module identifying information that is contained in the expected kernel module list 103. In accordance with some implementations, the intrusion monitor 106 may also perform the kernel module evaluation 211 after boot of the computer platform for purposes of checking identifying information 264 of kernel modules that were loaded during the boot against the expected kernel module identifying information that is contained in the expected kernel module list 103.

In accordance with example implementations, for each kernel module, the intrusion monitor 106 also determines, as depicted at reference numeral 210, symbol information for the kernel module. The intrusion monitor 106 may further perform the symbol information determination 210 for symbols 189 other than kernel modules. The symbol information provides a baseline for a corresponding symbol 189 that is monitored by the scanning engine 172. As an example, in accordance with some implementations, the symbol information may be a memory address of a memory region corresponding to the symbol 189; a size of the memory region; and a hash digest representing a measurement of the content of the memory region.

At runtime, the intrusion monitor 106 may determine symbol information for a given kernel module in response to the kernel module being loaded. In this manner, the hash digest for the corresponding symbol 189 may be the measurement of the content of a memory region into which the binary of the kernel module is loaded. In accordance with some implementations, the intrusion monitor 106 may determine, after boot and near the start of runtime, symbol information for kernel modules that were loaded during boot of the computer platform. The intrusion monitor 106, in general, may determine symbol information for symbols 189 at or near the time that the symbols 189 are loaded into memory. In general, a particular symbol 189 may correspond to any element stored in kernel space, such as a kernel module, base kernel instructions or code, or kernel data. By determining the symbol information for a given element when the element is first stored in the kernel space, a baseline is established from which the scanning engine 172 may determine whether any changes to the given element have occurred or if so, whether the change(s) are to be expected.

In accordance with example implementations, the intrusion monitor 106 communicates unexpected kernel module alerts and information about the symbols 189 to the scanning engine 172 using the measurement manifests 101. In accordance with example implementations, a measurement manifest 101 contains one or multiple records, or entries 205, and each entry 205 corresponds to a particular symbol 189. FIG. 2 illustrates example entries 205 of a measurement manifest 101: an entry 205-1 for a symbol 189 corresponding to kernel code; an entry 205-2 for a symbol 189 corresponding to kernel data; and an entry 205-3 for a symbol corresponding to a kernel module.

An entry 205 may include an address field 208, which contains data that represents an address of a memory region in which the corresponding symbol 189 is stored. As an example, an address may be a base address and an offset address for the symbol 189. As another example, an address may be an offset address for the symbol 189. An entry 205 may include a size field 209, which contains data that represents the size of the memory region. Moreover, an entry 205 may contain a hash digest field 218 that contains data that represents a hash digest, which is calculated by applying a cryptographic hash algorithm to the content of the memory region. The calculation of the hash digest may be performed by the intrusion monitor 106 or may be performed by another component (e.g., a cryptographic engine of a TPM or a cryptographic engine of the baseboard management controller 170), depending on the particular implementation.

In accordance with example implementations, for a symbol 189 that corresponds to a kernel module, the corresponding entry 205 (e.g., entry 205-3) may include an alert field 219, which contains data that represents whether or not (as determined by the intrusion monitor 106) the corresponding kernel module is expected. In accordance with some implementations, the alert field 219 may represent an alert flag. For example, the alert field 219 may contain a bit that has one logical state (e.g., a set state, or "1" state) to represent an alert that the corresponding kernel module is unexpected and another logical state (e.g., a clear state, or "0" state) to represent that the corresponding kernel module is expected.

The scanning engine 172 receives and processes the measurement manifests 101 for purposes of performing symbol integrity scanning 214. More specifically, in accordance with example implementations, based on the symbol information from the measurement manifests 101, the scanning engine 272 continually scans the symbols 189 for purposes of detecting any unexpected changes in the symbols 189. Characteristics of the scanning 214 may be set by the policy engine 175. In this manner, the policy engine 175 may specify one or multiple policies that control the scanning 214, such as criteria to be used to evaluate whether symbol changes are expected; and criteria defining how often the scanning is to be repeated. The policy engine 175 may also specify one or multiple polices regarding responsive action(s) that are to be taken by the scanning engine 172 if the symbol integrity scanning 214 detects an unexpected change in a symbol 189.

As examples, the responsive actions may include logging information about the symbol 189; sending an alert notification 250 to a local or remote operator; shutting down the computer platform; resetting the computer platform; taking one or multiple recovery actions (e.g., restoring a kernel image from a golden copy); quiescing cloud operations being performed by the computer platform; isolating the computer platform from a cloud computing system; isolating the computer platform from external network fabric; restricting the computer platform solely to management operations (e.g., management operations conducted using the baseboard management controller 170 in communication with a management network); as well as other and/or different responsive actions.

In accordance with example implementations, an alert notification 250 may be a "computer platform alert notification" (or "platform alert notification"), which is a communication (e.g., a Redfish message, an email, a text or other communication) containing information about a particular security event occurring (e.g., an unexpected kernel module being loaded) on a computer platform. As an example, a computer platform alert notification may be used to inform one or multiple personnel (e.g., a system administrator or a SIEM security analyst) about the occurrence of a particular security event and details (e.g., time, security event type, a name, a hash, an affected IP address and other and/or different relevant information depending on the event) about the security event. Depending on the particular implementation, a given alert notification 250 may be associated with one or multiple security events.

The scanning engine 172, in accordance with example implementations, processes entries 205 (e.g., entry 205-3) of the measurement manifests 101 corresponding to kernel modules for purposes of determining whether an alert for an unexpected kernel module has been generated by the intrusion monitor 106. The scanning engine 172, in accordance with example implementations, in response to the alert field 219 of an entry 205 indicating an alert for a corresponding kernel module, takes one or multiple responsive actions based on a policy 171 that is applied by the policy engine 175.

The responsive action(s) in general, may include any of a number of actions, such as logging information; sending an alert notification 250 to a local or remote operator; or other responsive action. The particular policy 171 governing the particular responsive actions may be based on an application or use of the computer platform.

As an example of responsive actions for a particular application, or use, a computer platform may execute tenant software for cloud-based computing system. The responsive actions may include, for example, logging information about an unexpected kernel. As another example, the responsive actions may include alerting a system administrator. As another example, the responsive actions may include quiescing cloud operations that are being performed by the computer platform. As another example, the responsive actions may include isolating the computer platform from a cloud computing system. As another example, the responsive actions may include isolating the computer platform from external network fabric.

As another example of responsive actions for a particular application, or use, a computer platform may be part of a private enterprise network. The responsive actions may include, for example, logging information about the unexpected kernel module and sending an alert to a system administrator or security analyst.

As another example of responsive actions for a particular application, or use, a computer platform may be used for defense department services. The responsive actions may include, for example, logging information about the unexpected kernel module. As another example, the responsive actions may include initiating a shutdown of the computer platform. As another example, the responsive actions may include restricting the computer platform solely to management operations (e.g., management operations conducted using the baseboard management controller 170 in communication with a management network). As another example, the responsive actions may include quarantining the computer platform (e.g., isolating the computer platform from an external network).

In accordance with example implementations, the intrusion monitor 106, in response to a kernel module loading event 260, determines information 264 about the kernel module, and performs a kernel module evaluation 211 by checking the information 264 against the information contained in the expected kernel module list 103. More specifically, in accordance with example implementations, the expected kernel module list 103 contains records, or entries 290, where each entry 290 corresponds to a respective expected kernel module.

Each entry 290 may contain, in accordance with example implementations, data that represents a two-element tuple. The tuple includes a name 271 of an expected kernel module and a hash digest 273 for the expected kernel module. In accordance with example implementations, the hash digest 273 is a fingerprint, or measurement, for the expected kernel module, which is derived by applying a cryptographic hash function to the source file(s) from which the kernel module object file is built. As such, the hash digest 273 for an expected kernel module may be different than an in-memory hash (e.g., a hash digest of the measurement manifest 101) of the kernel module when loaded into memory.

As depicted in FIG. 2, the kernel module information 264 may include a name 265 and a hash digest 267 for a particular kernel module. The intrusion monitor 106 may therefore, in response to a kernel module loading event 260, determine a name 265 and a hash digest 267 for a kernel module and compare this information against the expected kernel module list 103 for purposes of determining whether there is a corresponding entry 290 of the list 103. Stated differently, for a given kernel module, the intrusion monitor 106 may determine whether the expected kernel module list 103 contains an entry 290 having a name 271 that corresponds to the name 265 of the given kernel module and a hash digest 273 that corresponds to the hash digest 267 of the given kernel module. If so, then the given kernel module is expected. Otherwise, the given kernel module is unexpected.

As an example, a name 265 of a kernel module may be embedded in the corresponding kernel module object file. For example, the kernel module object file may have a section (e.g., a .modinfo section for the Linux operating system) that contains information about the kernel module, including the name 265. The kernel module object file may be digitally signed, which preserves the integrity of the embedded kernel module name 265. For example, the kernel module object file may be cryptographically signed using the private part (or "private key") of an asymmetric cryptographic key (e.g., a Rivest-Shamir-Adleman (RSA) key). The public part (or "public key") of the asymmetric key may be used, by the kernel, to determine, based on the cryptographic signature and the content of the kernel module object file, whether any tampering with the kernel module object file (including the embedded kernel module name) has occurred, as tampering invalidates the cryptographic signature. Moreover, in accordance with example implementations, the kernel does not load a kernel module object file that has an invalid signature.

In accordance with further implementations, a name 265 of a kernel module may not be embedded into the kernel module object file. Even though not embedded in the kernel module object file, the name 265 may still be cryptographically protected. For example, an operating system may have a kernel module package file (e.g., a Windows NT signed catalog file), which is digitally signed and contains names of kernel module object files contained in the package file. This digital signature preserves the integrity of the kernel module names that are contained in the kernel module package file, as renaming a particular kernel module object file invalidates the signature of the package file.

The hash digest 267, in accordance with example implementations, is generated by applying a cryptographic hash algorithm to the source file(s) that are compiled to build the kernel module object file. Because the hash digest 267 is derived from the source file(s), the hash digest 267 may be determined without first loading and running the kernel module.

The intrusion monitor 106 may determine the hash digest 267 in one of multiple ways. For example, in accordance with some implementations, the intrusion monitor 106 may directly calculate the hash digest 267 by applying a cryptographic hash function to the source file(s) corresponding to the kernel module object file. In accordance with further implementations, the intrusion monitor 106 may use a cryptographic engine (e.g., a cryptographic engine that is part of a TPM or the baseboard management controller 170) for purposes of determining the hash digest 267.

In accordance with other example implementations, the intrusion monitor 106 may read data from the kernel module object file, which represents the hash digest 267. As an example, for the Linux operating system, the hash digest 267 may be a source version (called "srcversion") that is contained in the ".modinfo" section of the kernel module object file. The intrusion monitor 106 may, for example, execute the module information command (called "modinfo") using the name of a kernel module object file as a parameter to extract the source version from the kernel module object file. In accordance with example implementations, the hash digest 267 may be generated and incorporated into the kernel object file as part of the process to build the kernel object file. For example, for the Linux operating system, a build script (e.g., a modpost build script) may be used to build the kernel object file, and the build script may be configured (e.g., config_module_srcversion_all=y") to cause the build script to determine the source version and write the source version into the .modinfo section of the kernel module object file.

A hash digest 267 for a kernel module may be generated by a program other than a script that builds the kernel module object, in accordance with further implementations.

In accordance with further example implementations, the kernel stores a hash digest 267 (e.g., srcversion or a hash digest of another type) for every kernel module that the kernel loads. The kernel may, for example, store the hash digests 267 in a kernel memory data structure, and the intrusion monitor 106 may retrieve the hash digest 267 for a given kernel module directly from kernel memory.

Any of a number of cryptographic hash algorithms may be used to generate a hash digest 267 for a kernel module. For example, in accordance with some implementations, the cryptographic hash algorithm may be the MD4 Message-Digest Algorithm (Request for Comments (RFC) 1320). In accordance with further implementations, the cryptographic algorithm may be a more secure algorithm, such as, for example, the SHAKE128 algorithm (FIPS Pub. 202) or the SHAKE256 algorithm (FIPS Pub. 202).

In accordance with example implementations in which the hash digest 267 is part of a kernel module object file, after the kernel module object file is digitally signed, any tampering with the hash digest 267 invalidates the signature and results in the kernel not loading the kernel module.

In accordance with further example implementations, the hash digest 267 may be generated by applying a cryptographic hash algorithm to a binary (e.g., machine-readable instructions and/or data) of the kernel module object file.

For purposes of generating the expected kernel module list 103, the names 291 and hash digests 292 for the expected kernel modules may be determined in ways similar to those described herein for determining the names 265 and hash digests 267.

Referring back to FIG. 1, the expected kernel module list 103 may be potentially vulnerable to tampering in the absence of adequate security measures. For example, without adequate security measures, an attacker might modify the file 107 containing the expected kernel module list 103 or substitute in an alternative expected kernel module list 103 so that the list 103 identifies unauthorized and potentially harmful kernel modules as being authorized, or expected.

For purposes of detecting tampering with the expected kernel module list 103, in accordance with some implementations, the expected kernel module list 103 may be signed with a private key (e.g., the private part of an asymmetric RSA key). In this manner, in accordance with example implementations, content of the file 107 (include the expected kernel module list 103) may be signed with a private key. In accordance with some implementations, a public key certificate, which contains the corresponding public key may be added to an UEFI secure boot key database 144 of the computer platform 100. In accordance with some implementations, the public key certificate may be added to the UEFI secure boot key database 144 by adding a public key as a machine owner key (MOK) to an UEFI MOK database 140 of the computer platform 100. The UEFI MOK database 140 is a UEFI feature, which allows a user or system administrator to provide keys and hashes to augment the keys and hashes of the UEFI secure boot key database 144. The keys from the UEFI MOK database 140 may also be added to the system key ring in addition to the keys from the key database. An advantage of using the UEFI secure boot key database 144 is that even a root user of the kernel cannot enroll a key, as this enrollment requires access to the UEFI.

In accordance with further implementations, the expected kernel module list 103 may be signed with a private key whose corresponding public key certificate is available early on during the boot process. As an example, in accordance with some implementations, the private key may be a Linux Integrity Measurement Architecture/Extended Verification Module (IMA/EVM) key, which may be added to the initial RAM file system of the computer platform 100 so that the private key is available during early boot. In accordance with example implementations, a script (e.g., an initramfs script) may be used to add a key from the RAM file system to the kernel key ring.

In accordance with further implementations, a component of the computer platform 100 other than a kernel component (e.g., the intrusion monitor 106), may check information about loaded kernel modules against the information that is contained in the expected kernel module list 103 for purposes of determining whether the kernel modules are authorized, or expected. For example, in accordance with some implementations, the scanning engine 172, instead of the intrusion monitor 106, may check information for kernel modules against the expected kernel module list 103. More specifically, for these example implementations, the measurement manifest entries for kernel modules do not contain alert fields, but rather, the scanning engine 172 may, responsive to identifying a particular symbol associated with a kernel module, determine a name and hash digest for the kernel module and compare this information to the entries of the expected kernel module list 103 for purposes of determining whether or not the kernel module is expected. Moreover, for these example implementations, the expected kernel module list 103 may be stored in a memory (e.g., a non-volatile memory of the baseboard management controller 170) that is accessible by the scanning engine 172. The scanning engine 172 may take the appropriate responsive action(s) to any kernel modules that the scanning engine 172 determines are unexpected, as described herein.

As such, in accordance with some implementations, one or multiple hardware processors 110 of the computer platform 100 may execute kernel instructions to compare kernel module information against the expected kernel module list 103 and generate alerts for unexpected kernel modules based on this comparison. In accordance with further implementations, another set of one or multiple hardware processors of the computer platform 100, which are independent from the kernel 104, such as the processing core(s) 154 of the baseboard management controller 170, may execute instructions to compare kernel module information against the expected kernel module list 103 and generate alerts for unexpected kernel modules based on this comparison.

Figure 3:
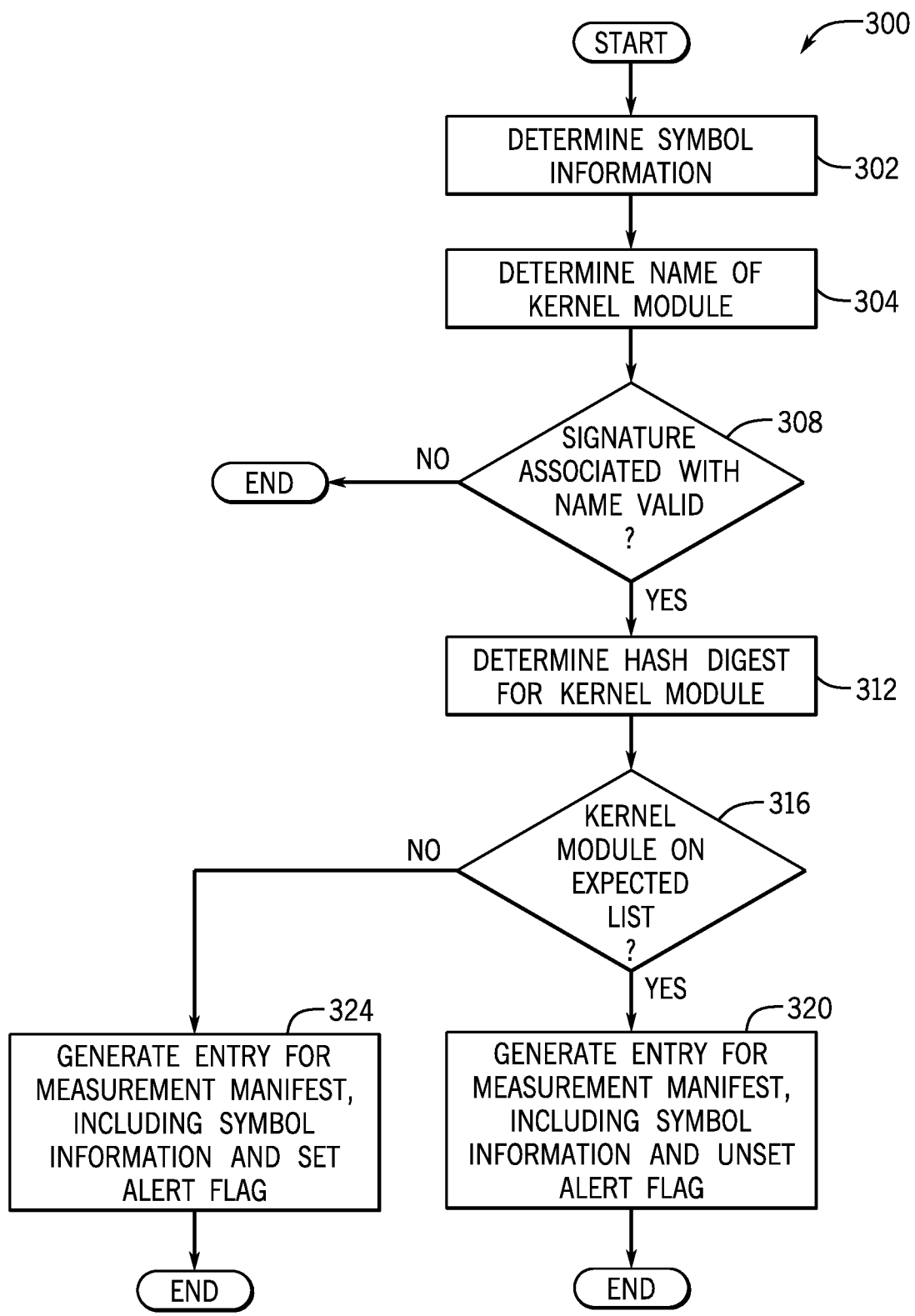
FIG. 3 is a flow diagram depicting a process performed by a kernel to generate a measurement manifest entry corresponding to a kernel module according to an example implementation.

FIG. 3 depicts an example process 300 that may be performed by a kernel (e.g., a kernel configured by a kernel module corresponding to the intrusion monitor 106) in response to a kernel module loading event, in accordance with some implementations. It is noted that the kernel module loading event may or may not result in the kernel module being loaded. As examples, if the kernel determines that the signature of the kernel module object file is invalid or determines that the signature of a kernel module catalog package file is invalid, then the kernel may not load the kernel module. In accordance with some implementations, the kernel performs the process 300 in response to a kernel module loading event.

Referring to FIG. 3, in accordance with example implementations, the process 300 includes determining (block 302) symbol information for the kernel module. Moreover, the process includes determining (block 304) the name of the kernel module. If, pursuant to decision block 308, the signature associated with the name is valid, then, pursuant to block 312, the process 300 includes determining a hash digest for the kernel module. The process 300 then includes, based on an expected kernel module list, determining (block 316) whether the kernel module is expected. If the signature associated with the name is determined in decision block 308 to be invalid, then the process 300 ends. If the kernel module is unexpected, pursuant to decision block 316, then, in accordance with example implementations, the process 300 includes, pursuant to block 324, generating an entry for the measurement manifest, including the symbol information and setting the alert flag. Otherwise, if in decision block 316, a determination is made that the kernel module is expected, then, pursuant to block 320, the process 300 includes generating an entry for the measurement manifest, including symbol information and an unset alert flag.

Figure 4:
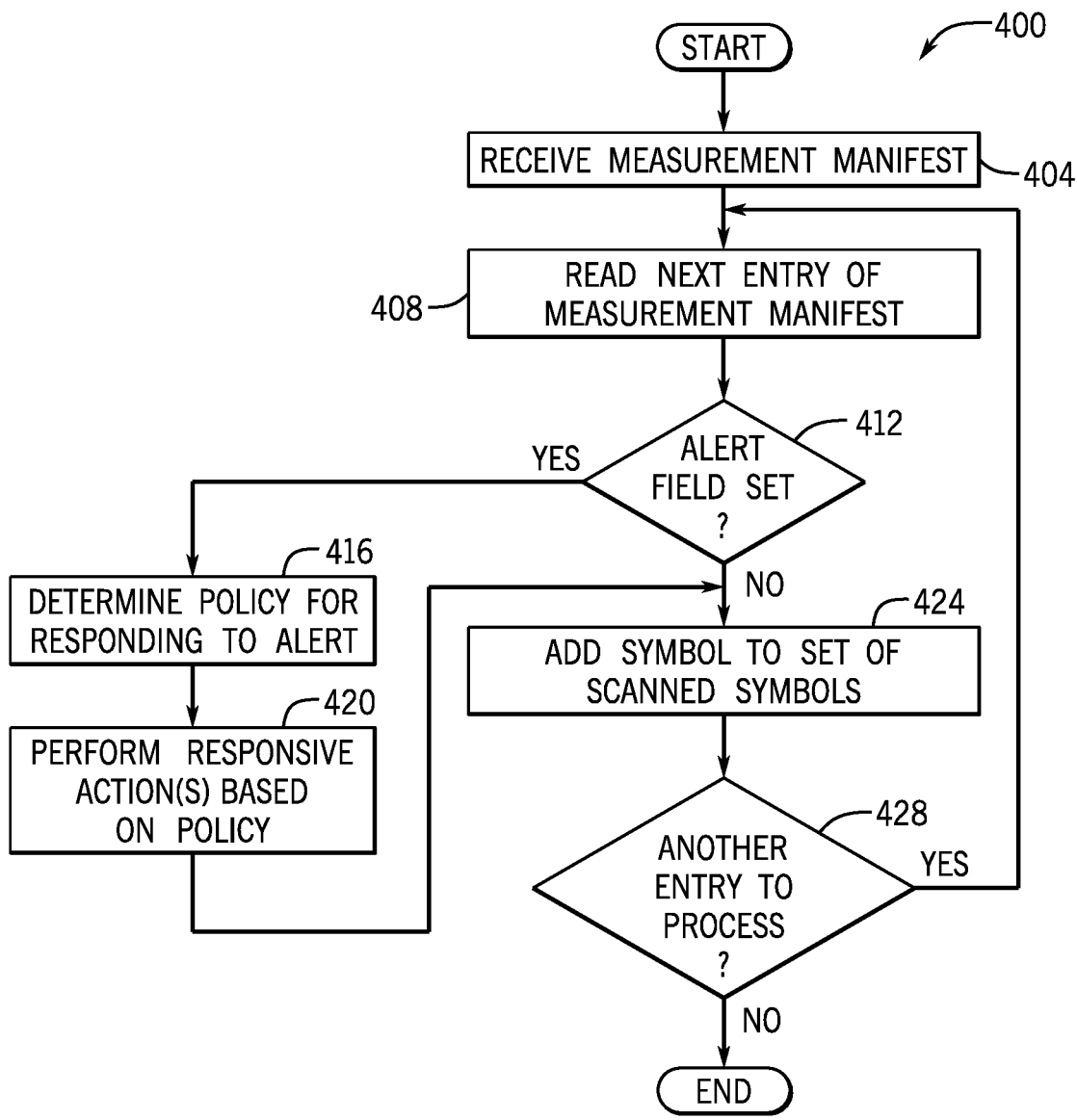
FIG. 4 is a flow diagram depicting a process performed by the scanning engine to process measurement manifest entries according to an example implementation.

In accordance with example implementations, a process 400 that is depicted in FIG. 4 may be used by the scanning engine 172 for purposes of processing measurement manifest entries. Pursuant to block 404, the scanning engine receives a measurement manifest. In accordance with some implementations, receiving the measurement manifest may include the scanning engine reading data from a buffer of the baseboard management controller, which represents the measurement manifest.

The scanning engine may then begin processing the entries of the received measurement manifest. In this processing, the scanning engine reads (block 408) the next entry of the measurement manifest and determines, based on the entry, whether an alert field of the entry is set, pursuant to decision block 412. If the alert field is set, then the scanning engine communicates with the policy engine for purposes of determining the policy for responding to the alert. Block 416 may include, for example, the scanning engine communicating criteria to a policy engine representing one or multiple characteristics or properties (e.g., the name, the number of unexpected kernel modules occurring in a certain period of time, a category associated with the kernel module, or other characteristics) of the corresponding kernel module. In accordance with example implementations, the scanning engine may then, pursuant to block 420, perform one or multiple responsive actions based on the policy. Block 420 may include, for example, the policy engine specifying the responsive action(s) to be performed by the scanning engine.

In accordance with example implementations, the process 400 includes, regardless of whether the alert field was set or not, extracting the symbol information from the entry and adding the symbol to the set of scanned symbols, pursuant to block 424. If, pursuant to decision block 428, there is another entry of the measurement manifest to process, then control proceeds back to block 408 to read another entry of the measurement manifest.

Figure 5:
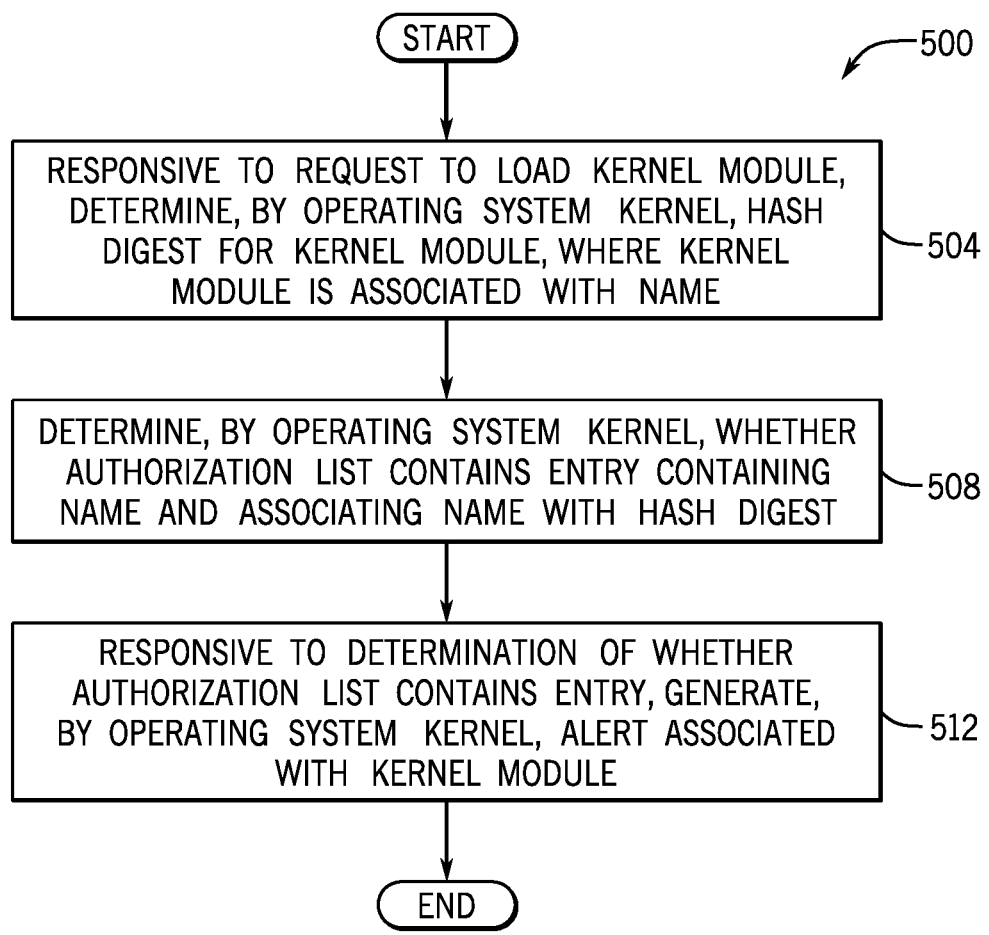
FIG. 5 is a flow diagram of an operating system kernel-based process to generate alerts associated with unexpected kernel modules according to an example implementation.

Referring to FIG. 5, in accordance with example implementations, a process 500 includes, responsive to a request to load a kernel module, determining (block 504), by an operating system kernel, a hash digest for the kernel module. The kernel module is associated with a name. In accordance with some implementations, the hash digest may be a hash of a source file used to build a kernel module object file corresponding to the kernel module. In accordance with some implementations, the hash digest may be contained in an information section of a kernel object module file that corresponds to the kernel module. In accordance with some implementations the hash digest may be stored in a kernel space data structure. In accordance with some implementations, the name may be a file name embedded in a kernel object file corresponding to the kernel module or a name embedded in the kernel object file. In accordance with some implementations, the name may be a name embedded in a file package containing a kernel module object file corresponding to the kernel module.

Pursuant to block 508, the process 500 includes determining, by the operating system kernel, whether an expected kernel module list contains an entry containing the name and associating the name with the hash digest. In accordance with some implementations, the expected kernel module list may be stored in an expected location. For example, the expected kernel module list may be part of a file that is stored on a storage device in a predetermined file path. In accordance with some implementations, the expected kernel module list may be signed by a cryptographic key, and the operating system kernel may determine whether the authorization list is valid based on the cryptographic key.

The process 500 further includes, pursuant to block 512, responsive to the determination of whether the expected kernel module list contains an entry, generating, by the operating system kernel, an unexpected kernel module alert. In accordance with some implementations, generating the unexpected kernel module alert includes alerting a management controller, such as a baseboard management controller. In accordance with some implementations, the baseboard management controller may further scan symbols associated with the operating system kernel for purposes of detecting tampering with the operating system kernel. The baseboard management controller may generate computer platform alert notifications responsive to detection of operating system kernel tampering and responsive to unexpected kernel modules.

Figure 6:
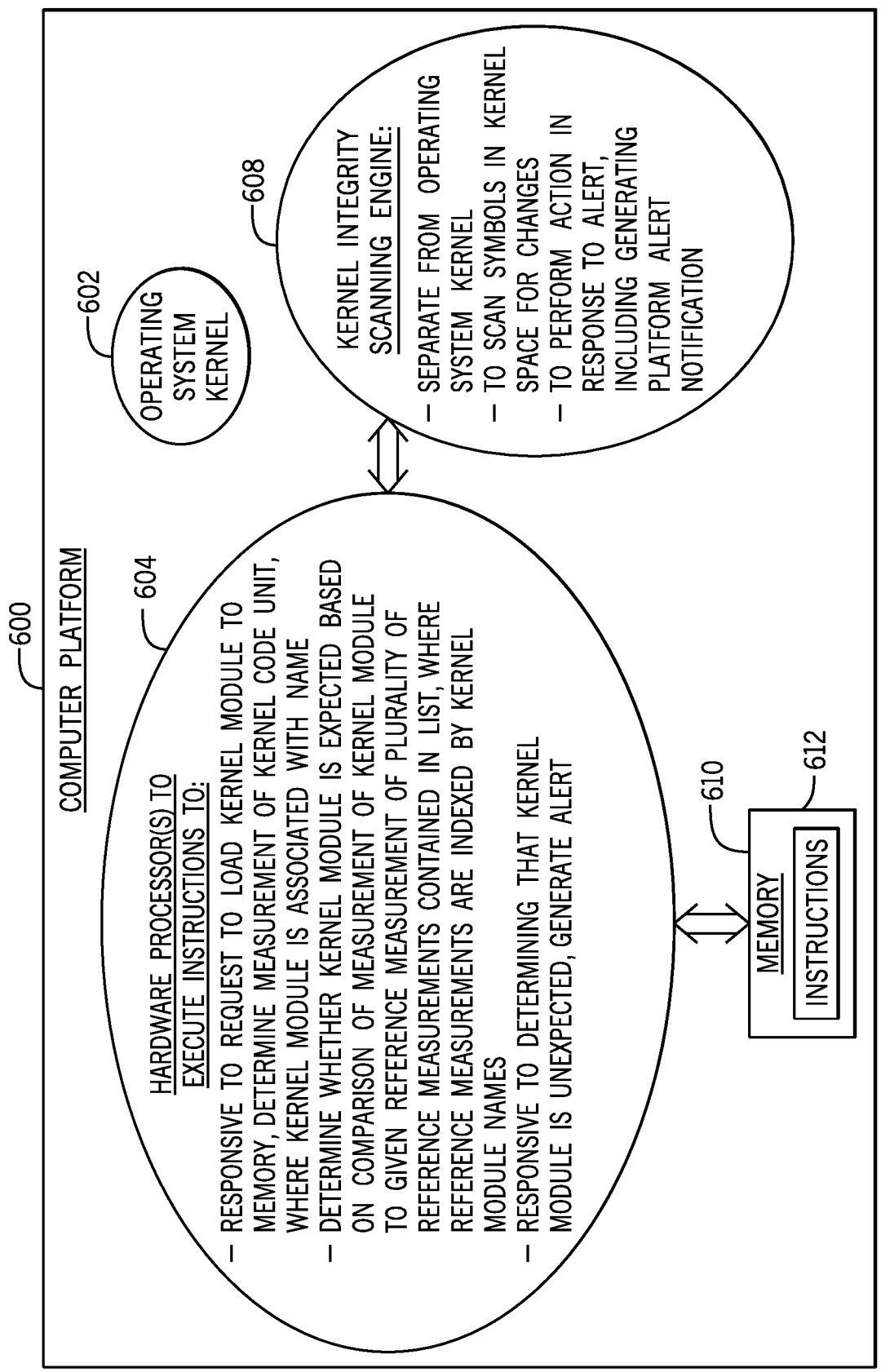
FIG. 6 is a block diagram of a computer platform having a hardware processor to determine whether a kernel module is unexpected and communicate an alert for a determined, unexpected kernel module to a kernel integrity scanning engine of the platform according to an example implementation.

Referring to FIG. 6, in accordance with example implementations, a computer platform 600 includes one or multiple hardware processors 604; an operating system kernel 602; a memory 610 and a kernel integrity scanning engine 608. The kernel integrity scanning engine 608 is separate from the operating system kernel 602. As an example, in accordance with some implementations, the computer platform 600 may be a server. In accordance with some implementations, the kernel integrity scanning engine 608 may be provided by a management controller of the computer platform, such as, for example, a baseboard management controller. For example, in accordance with some implementations, the kernel scanning engine 608 may be provided by dedicated hardware (e.g., a CPLD, ASIC or FPGA) of the baseboard management controller. As another example, in accordance with some implementations, the kernel scanning engine 608 may be formed by one or multiple processing cores of the baseboard management controller executing machine-readable instructions.

The kernel integrity scanning engine 608 scans symbols in kernel space for changes. For example, in accordance with some implementations, the kernel integrity scanning engine 608 scans symbols in kernel space for unexpected changes, and the kernel scanning engine 608 may generate a computer platform alert (e.g., a Redfish alert, an email or a text message) for any unexpected change. A computer platform alert may be communicated for purposes of being handled by a SIEM security analyst, a system administrator or other person, in accordance with example implementations. In accordance with example implementations, the kernel integrity scanning engine 608 may generate a computer platform alert in response to an alert that is provided by the hardware processor(s) 604 determining that a kernel module is unexpected.

In accordance with some implementations, the hardware processor(s) 604 may include one or multiple central processing unit (CPU) processing cores or CPU sockets. The hardware processor(s) 604 may be the main processors of the computer platform 600 and execute machine-readable instructions to provide the operating system kernel 602, in accordance with example implementations. In accordance with further example implementations, the hardware processor(s) 604 may be separate from the operating system kernel 602. For example, in accordance with some implementations, the hardware processor(s) 604 may be part of a baseboard management controller and execute machine-readable instructions to perform one or multiple management services for the computer platform 100. In accordance with some implementations, the hardware processor(s) 604 may execute machine-readable instructions to provide the kernel integrity scanning engine 608.

In accordance with some implementations, the memory 612 may store instructions 614 that, when executed by the hardware processor(s) 604, cause the hardware processor(s) 604 to, responsive to a request to load a kernel module to the memory 612, determine a measurement of the kernel module. The kernel module is associated with a name.

In accordance with example implementations, determining a measurement of the kernel module includes determining a cryptographic hash digest for the kernel module. In accordance with some implementations, determining the measurement of the kernel module includes determining a hash digest based on source files corresponding to the kernel module. In accordance with some implementations, determining the measurement of the kernel module includes reading the measurement from the kernel module or reading the measurement from a kernel space data structure. In accordance with some implementations, the name associated with the kernel module is a file name contained in a binary of the kernel module. In accordance with some implementations, the name associated with the kernel module is a name embedded in a catalog of files.

The instructions, when executed by the hardware processor(s) 604, cause the hardware processor(s) 604 to determine whether loading of the kernel module is expected based on a comparison of the measurement of the kernel module to a given reference measurement of a plurality of reference measurements that are contained in a list. The reference measurements are indexed by kernel module names. In accordance with some implementations, the list may be stored in a file that is stored in an expected location. In accordance with example implementations, the hardware processor(s) 604 may be part of a baseboard management controller of the computer platform 600, and the list may be stored in a memory of the baseboard management controller. In accordance with some implementations, the list may be an expected list of kernel modules. In accordance with some implementations, the list may be cryptographically signed by a private part of an asymmetric cryptographic key. In accordance with some implementations, a public key certificate corresponding to the private key may be stored in a firmware database. In accordance with some implementations, the firmware database may be an UEFI database. In accordance with some implementations, the public key may be stored in a machine owner key (MOK) UEFI database.

The instructions 614, when executed by the hardware processor(s) 604, cause the hardware processor(s) 604 to, responsive to determining that the loading of the kernel module is unexpected, communicate an alert associated with the kernel module to the kernel integrity scanning engine. In accordance with some implementations, communicating the alert includes the hardware processor setting an alert flag associated with the kernel module to alert the kernel integrity scanning engine to the unexpected loading of the kernel module. In accordance with example implementations, the hardware processor compares the measurement of the kernel module to the given reference measurement as part of an operating system kernel function. In accordance with example implementations, determining whether the loading of the kernel module is expected includes the hardware processor validating a signature associated with the list.

In accordance with example implementations, the instructions 614, when executed by the hardware processor(s) 604, cause the hardware processor(s) 604 to, upon determining that the loading of the kernel module is unexpected, communicate an alert that is associated with the kernel module to the kernel integrity scanning engine. In accordance with some implementations, the kernel integrity scanning unit may generate a computer platform alert notification in response to the alert of the unexpected kernel module. In accordance with example implementations, the kernel integrity scanning engine may generate the platform alert notification based on an alert policy.

Figure 7:
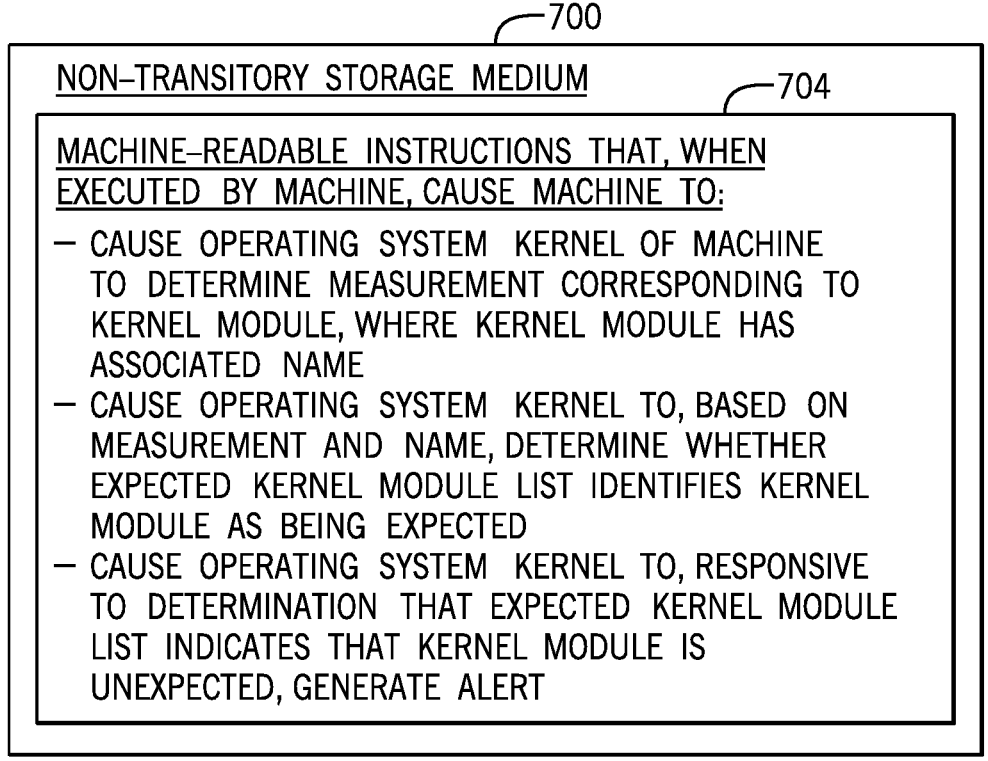
FIG. 7 is an illustration of a non-transitory storage medium to store instructions that, when executed by a machine, cause the machine to cause an operating system kernel to determine whether an expected kernel module list indicates that a kernel module is expected and generate an alert responsive to a determination that the kernel module is unexpected according to an example implementation.

Referring to FIG. 7, in accordance with example implementations, a non-transitory storage medium 700 stores machine-readable instructions 704. The instructions 704, when executed by a machine, cause the machine to cause an operating system kernel of the machine to determine a measurement corresponding to a kernel module. The kernel module has an associated name. In accordance with example implementations, the measurement may be a hash digest corresponding to the kernel module. In accordance with some implementations, the hash measurement may be a hash measurement corresponding to one or multiple source files of the kernel module.

In accordance with some implementations, the hash digest may be a source version of one or multiple source files associated with the kernel module. In accordance with some implementations, the name may be a name embedded in a kernel module object file. In accordance with some implementations, the name may be a name embedded in a catalog associated with the kernel module. In accordance with example implementations, the instructions, when executed by the machine, may cause the machine to cause the operating system kernel to determine a validity of a name associated with the kernel module based on a cryptographic signature. The operating kernel may not, in accordance with example implementations, load the kernel module in response to a cryptographic signature of an object file or file catalog not being validated.

The instructions 704, when executed by the machine, further cause the machine to cause the operating system kernel to, based on the measurement and the name, determine whether an expected kernel module list identifies the kernel module as being expected. In accordance with some implementations, the operating system kernel determines a validity of the expected kernel module list. In accordance with some implementations, the expected kernel module list may be a file that is stored in an expected location, such as a file that is stored in a predetermined file path of a storage device. In accordance with some implementations, determining the validity of the expected kernel module list may involve determining the validity based on a cryptographic key and a signature associated with the expected kernel module list. In accordance with example implementations, the operating system kernel may provide a symbol associated with the kernel module to a scanning engine that is part of the machine and is separate from the operating system kernel. The scanning engine may generate an alert notification for the machine responsive to the symbol changing in an unexpected way.

The instructions 704, when executed by the machine, cause the machine to cause the operating system kernel to, responsive to the determination that the expected kernel module list identifies the kernel module as being unexpected, generate an alert. In accordance with some implementations, the alert may be provided as part of a measurement manifest that is provided by the operating system kernel to a kernel integrity scanning engine that is separate from the operating system kernel. In accordance with example implementations, the kernel integrity scanning engine may generate an alert notification for the machine responsive to an alert indicating that a kernel module is unexpected.

In accordance with example implementations, determining the hash digest includes determining, by the operating system kernel, a hash of a source file used to build the kernel module. A particular advantage is that the generation of critical alerts in a computer platform may be efficiently controlled.

In accordance with example implementations, determining the hash digest includes determining, by the operating system kernel, a hash of a binary of the kernel module. A particular advantage is that the generation of critical alerts in a computer platform may be efficiently controlled.

In accordance with example implementations, the process includes verifying, by the operating system kernel, a validity of the name based on a cryptographic signature that corresponds to the kernel module. A particular advantage is that the generation of critical alerts in a computer platform may be efficiently controlled.

In accordance with example implementations, generating the alert includes communicating, by the operating system kernel, data representing the alert of a kernel space scanning engine. The kernel space scanning engine is separate from the operating system kernel. A particular advantage is that the generation of critical alerts in a computer platform may be efficiently controlled.

In accordance with example implementations, the process further includes communicating, by the operating system kernel, additional data with the kernel space scanning engine. The additional data represents a kernel space address of the kernel module and a measurement of kernel space content corresponding to the kernel module. A particular advantage is that the generation of critical alerts in a computer platform may be efficiently controlled.

In accordance with example implementations, the kernel module for which the alert is generated is a first kernel module. The process further includes loading a second kernel module; and using the second kernel module to perform the determination of the hash digest; the determination of whether the expected kernel module list contains the entry; and the generation of the unauthorized loading alert. A particular advantage is that the generation of critical alerts in a computer platform may be efficiently controlled.

In accordance with example implementations, the process further includes determining, by the second kernel module, a second hash digest for a third kernel module that is loaded before the loading of the driver. The third kernel module is associated with a second name. The process further includes determining, by the second kernel module, whether the expected kernel module list contains a second entry containing the second name and associating the second name with the second hash digest. The process further includes, responsive to the determination of whether the expected kernel module list contains the second entry, generating, by the second kernel module, an alert that is associated with the third kernel module. A particular advantage is that the generation of critical alerts in a computer platform may be efficiently controlled.

In accordance with example implementations, the process further includes accessing, by the operating system kernel, a file containing data representing the expected kernel module list; and verifying, by the operating system kernel, a validity of the file based on an asymmetric cryptographic key. A particular advantage is that the generation of critical alerts in a computer platform may be efficiently controlled.

In accordance with example implementations, verifying the validity of the file includes accessing, by the operating system kernel, a public part of the asymmetric cryptographic key from a firmware secure boot key database and using the public part of the asymmetric cryptographic key to validate the file. A particular advantage is that the generation of critical alerts in a computer platform may be efficiently controlled.

In accordance with example implementations, verifying the validity of the file includes, responsive to a boot of a computer platform associated with the operating system kernel, storing data representing a public part of the asymmetric cryptographic key in a volatile memory of the computer platform; and transferring the data representing the public part of the asymmetric key to a kernel key ring. Verifying the validity of the file further incudes accessing, by the operating system kernel, the public part of the asymmetric cryptographic key from the kernel key ring and using the public part of the asymmetric cryptographic key to validate the file. A particular advantage is that the generation of critical alerts in a computer platform may be efficiently controlled.

In accordance with example implementations, the hardware processors(s) execute operating system kernel instructions to compare the measurement of the kernel module to the reference measurement(s). A particular advantage is that the generation of critical alerts in a computer platform may be efficiently controlled.

In accordance with example implementations, the computer platform may include a baseboard management controller, and the hardware processor(s) may be part of the baseboard management controller. A particular advantage is that the generation of critical alerts in a computer platform may be efficiently controlled.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
responsive to a request to load a kernel module, determining, by an operating system kernel executed by at least one processor, a hash digest for the kernel module, wherein the kernel module is associated with a name;
determining, by the operating system kernel executed by the at least one processor, whether an expected kernel module list contains an entry containing the name and associating the name with the hash digest; and
responsive to determining the expected kernel module list lacks the entry, generating, by the operating system kernel executed by the at least one processor, an alert associated with the kernel module; and
updating, by the operating system kernel executed by the at least one processor, a buffer of a baseboard management controller based on the alert, wherein the baseboard management controller is separate from the operating system kernel.

2. The method of claim 1, wherein determining the hash digest comprises determining, by the operating system kernel executed by the at least one processor, a hash of a source file used to build the kernel module.

3. The method of claim 1, wherein determining the hash digest comprises determining, by the operating system kernel executed by the at least one processor, a hash of a binary of the kernel module.

4. The method of claim 1, further comprising:
verifying, by the operating system kernel executed by the at least one processor, a validity of the name based on a cryptographic signature corresponding to the kernel module.

5. The method of claim 1, wherein updating the buffer comprises:
writing, by the operating system kernel executed by the at least one processor, data representing the alert to the buffer.

6. The method of claim 5, further comprising:
writing, by the operating system kernel executed by the at least one processor, additional data to the buffer, wherein the additional data represents a kernel space address of the kernel module and a measurement of kernel space content corresponding to the kernel module.

7. The method of claim 1, wherein the kernel module for which the alert is generated comprises a first kernel module, the method further comprising:
  loading, by the operating system kernel executed by the at least one processor, a second kernel module; and
  using, by the operating system kernel executed by the at least one processor, the second kernel module to perform the determination of the hash digest, the determination of whether the expected kernel module list lacks the entry, and the generation of the alert.

8. The method of claim 7, further comprising:
  determining, by the second kernel module, a second hash digest for a third kernel module loaded before the loading of the second kernel module, wherein the third kernel module is associated with a second name;
  determining, by the second kernel module, whether the expected kernel module list contains a second entry containing the second name and associating the second name with the second hash digest; and
  responsive to determining the expected kernel module list lacks the second entry, generating, by the second kernel module, an alert associated with the third kernel module.

9. The method of claim 1, further comprising:
  accessing, by the operating system kernel executed by the at least one processor, a file containing data representing the expected kernel module list; and
  verifying, by the operating system kernel executed by the at least one processor, a validity of the file based on an asymmetric cryptographic key.

10. The method of claim 9, wherein verifying the validity of the file comprises:
  accessing, by the operating system kernel executed by the at least one processor, a public part of the asymmetric cryptographic key from a firmware secure boot key database and using the public part of the asymmetric cryptographic key to validate the file.

11. The method of claim 9, wherein verifying the validity of the file comprises:
  responsive to a boot of a computer platform associated with the operating system kernel, storing data representing a public part of the asymmetric cryptographic key in a volatile memory of the computer platform;
  transferring the data representing the public part of the asymmetric cryptographic key to a kernel key ring; and
  accessing, by the operating system kernel executed by the at least one processor, the public part of the asymmetric cryptographic key from the kernel key ring and using the public part of the asymmetric cryptographic key to validate the file.

12. A computer platform comprising:
  an operating system kernel;
  at least one hardware processor;
  a memory to store instructions that, when executed by the at least one hardware processor, cause the at least one hardware processor to:
    responsive to a request to load a kernel module to the memory, determine a measurement of the kernel module, wherein the kernel module is associated with a name;
    determine, whether the kernel module is expected based on a comparison of the measurement of the kernel module to a given reference measurement of a plurality of reference measurements contained in a list, wherein the reference measurements are indexed by kernel module names; and
    responsive to determining that the kernel module is unexpected, generate an alert; and
    update a buffer of a baseboard management controller based on the alert; and
  the baseboard management controller, wherein the baseboard management controller is separate from the operating system kernel and is configured to:
    scan symbols in a kernel space for changes; and
    perform an action in response to the buffer being updated based on the alert, the action including generating a platform alert notification.

13. The computer platform of claim 12, wherein the instructions, when executed by the at least one hardware processor, to further cause the at least one hardware processor to determine a hash of a source file associated with the kernel module and compare the hash to the given reference measurement to determine whether loading of the kernel module is expected.

14. The computer platform of claim 12, wherein the at least one hardware processor executes operating system kernel instructions to compare the measurement of the kernel module to the given reference measurement.

15. A non-transitory storage medium to store machine-readable instructions that, when executed by at least one processor, cause the at least one processor to:
  cause an operating system kernel to determine a measurement corresponding to a kernel module, wherein the kernel module has an associated name;
  cause the operating system kernel to, based on the measurement and the name, determine whether an expected kernel module list identifies the kernel module as being expected; and
  cause the operating system kernel to, responsive to the determination that the kernel module is unexpected, generate an alert; and
  cause the operating system kernel to update a buffer of a baseboard management controller based on the alert, wherein the baseboard management controller is separate from the operating system kernel.

16. The non-transitory storage medium of claim 15, wherein the expected kernel module list is part of a file stored on a storage drive in a predetermined file path.

17. The non-transitory storage medium of claim 16, wherein:
  the file has an associated cryptographic signature; and
  the instructions, when executed by the at least one processor, further cause the at least one processor to validate the cryptographic signature based on a cryptographic key stored in a secure boot database.

18. The non-transitory storage medium of claim 15, wherein the instructions, when executed by the at least one processor, further cause the at least one processor to cause the operating system kernel to determine a hash of source files associated with the kernel module to determine the measurement.

* * * * *